May 23, 1944.  E. L. GINZTON  2,349,261
PHASE ANGLE INDICATOR
Filed Feb. 13, 1942
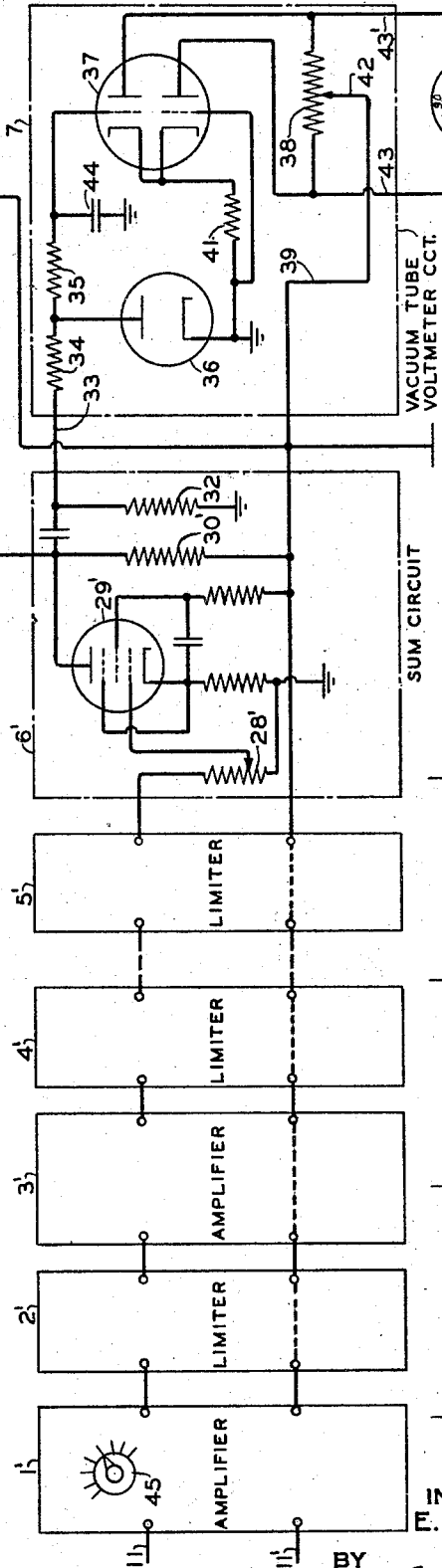
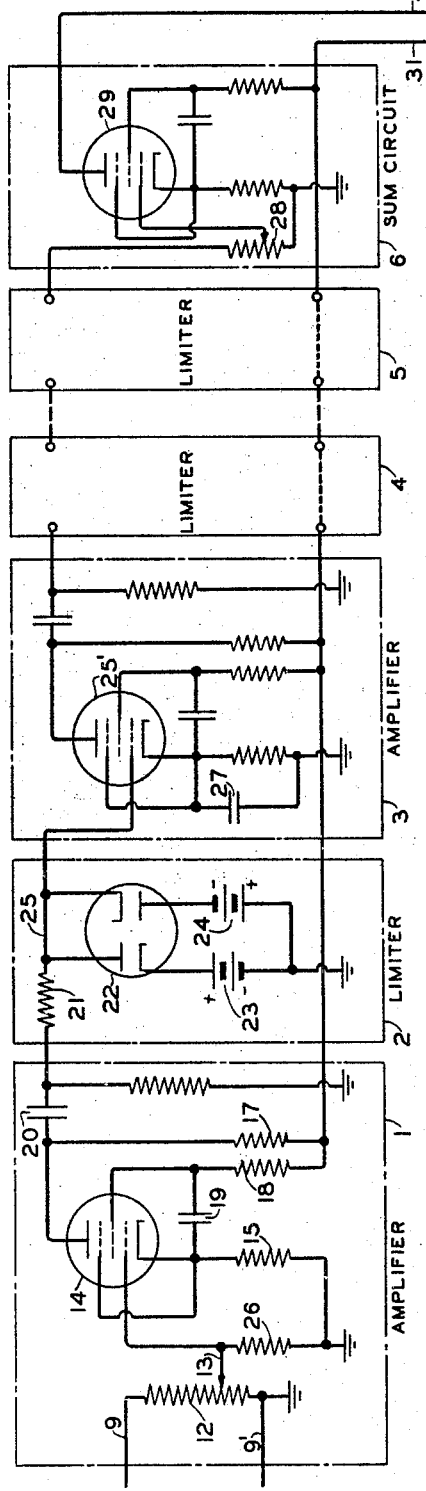
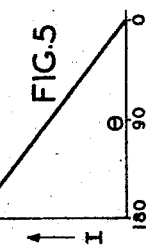
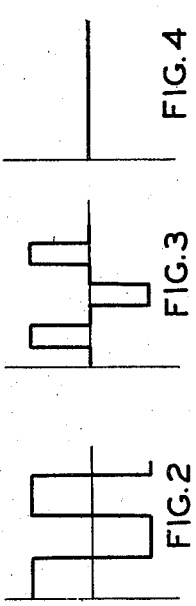
INVENTOR
E. L. GINZTON
BY
Paul B. Hunter
HIS ATTORNEY Patented May 23, 1944

2,349,261

UNITED STATES PATENT OFFICE 2,349,261

PHASE ANGLE INDICATOR

Edward L. Ginzton, Rockville Centre, N. Y., assignor to Sperry Gyroscope Company, Inc., Brooklyn, N. Y., a corporation of New York Application February 13, 1942, Serial No. 430,764

9 Claims. (Cl. 172—245)

The present invention relates, generally, to a novel apparatus and method for the measurement of phase angle between two sinusoidal alternating voltages, and the invention has reference, more particularly, to a novel phase angle indicator for accomplishing such measurements.

Prior art methods of phase angle measurement generally fall in two classifications; namely, those of the bridge type requiring balancing operations in order to secure null indications, and those which indicate phase angle directly on a conventional meter or other indicating device. In general, methods of the first classification require the use of complex bridge circuits or of phase shifting networks and consequently necessitate the use of considerable skill in operation and involve recalibration for each different frequency used. Prior art methods of the second type which give direct indication of phase angle on a meter usually give a meter indication which is proportional to the magnitude of the sum of, or the difference between the reference phase voltage and the unknown phase voltage, as well as upon the actual phase angle between the voltages. Thus the indicating meter can be calibrated directly in phase angle only when the input reference phase voltage and unknown phase voltage are carefully adjusted to be equal. Such measurement devices also rely upon a sine or cosine law relating the output meter reading to the actual phase angle difference, so that the actual meter calibration follows such a trigonometric law. Such a calibration, as well known, affords reasonable accuracy in measurement over a portion of the scale and very poor accuracy over about a fifth of the scale adjacent, for instance, to the zero deflection point of the meter.

One object of the present invention is to provide a novel method and apparatus for the measurement of electrical phase angles that overcomes the above defects of prior devices, the said apparatus producing an electrical signal which is linearly proportional to the phase angle and which may be, therefore, applied to any direct current meter or other indicating or recording device or servo mechanism to enable direct and continuous observation and/or recording of the phase angle between two alternating electrical potentials, voltages, or other quantities capable of being converted into electrical waves.

Another object lies in the provision of a phase angle indicator which consists of components so designed that their characteristics are substantially independent of aging of and variation in vacuum tubes due to manufacturing tolerances and are independent of bias and plate voltage to a large degree.

A further object is to provide such a novel phase angle indicator which is compact and portable and which is readily and easily calibratable and which requires no great skill for accurate operation.

Another object of the present invention is to provide a novel phase angle indicator whose reading is substantially independent of wide variations in the magnitude of either or both of the impressed voltages.

Still another object of the invention lies in the provision of a novel phase angle indicator wherein the instrument calibration is independent of frequency over a very wide frequency range, such, for example, as the entire audio range.

Other objects and advantages will become apparent from the specification, taken in connection with the accompanying drawing wherein one embodiment of the invention is illustrated.

In the drawing:

Fig. 1 is a wiring diagram of the apparatus of the present invention.

Figs. 2, 3, 4, 5, and 6 are explanatory graphs.

The phase angle indicator of this invention comprises two similar channels each adapted to receive a respective one of the sine waves whose phase angle difference is to be measured. Each of these channels consists of a plurality of amplifiers and limiters which serve to amplify and limit each wave a sufficient number of times so that the sine waves become square waves, the limiters being so adjusted that the square waves are of equal amplitude. These square waves are then applied to sum-taking tubes which are class A amplifiers with a common load resistance. Thus in Fig. 1 the first channel for amplifying and limiting one sine wave has input leads 9 and 9' supplying the wave to amplifier 1, the output of which is supplied to limiter 2 which feeds its output to amplifier 3, the output of which is limited by connected limiters 4 and 5. The output of limiter 5 is supplied to the sum-circuit 6 having the amplifier tube 29 whose output circuit lead 30 has the load resistor 30' therein. This load resistor is common to both the first and second channels. The second channel comprises amplifier 1' adapted to receive the second sine wave at leads 11, 11'. Amplifier 1' feeds into limiter 2' which in turn supplies amplifier 3', the output of which is supplied through limiters 4', 5' to the sum-circuit 6', the output of which includes the resistor 30'. The sum tubes 29 and 29' produce currents in the resistance 30' independently of each other and therefore, a voltage appears across this resistance which is the algebraic sum of the square waves. The voltage across resistor 30' is rectified by means of a diode 36 and connected filter circuit and a direct current meter 8 may be employed for directly indicating the phase angle between the two waves.

The signal supplied to leads 9, 9' is placed across a potentiometer 12, the tap 13 of which may be adjusted to place any desired portion of that input voltage across the cathode and first grid of pentode amplifier tube 14. Tube 14 is shown as an element of a conventional feedback type of amplifier circuit, the screen grid of tube 14 being attached directly to the cathode, a feedback resistor 15 being supplied between ground and the cathode of tube 14, the plate voltage for the tube being supplied by battery 16 through lead 31 and resistor 17 and also to the second grid of tube 14 through resistor 18. Screen bypass condenser 19 is provided between the screen grid of tube 14 and resistor 18, resistor 18 being large compared to feedback resistor 15 and preventing short-circuiting of resistor 15 through by-pass condenser 19.

The output of the amplifier 1 is fed through blocking condenser 20 into limiter 2, this output being an amplified alternating current voltage with characteristics specially suited for use in the present invention. It is well known in the art that the output of such a feedback amplifier has reduced phase and frequency distortion properties, has an amplification substantially independent of electrode voltages and the constants of the amplifier tube 14, and that the gain of the stage is substantially constant over a wide frequency range.

This output voltage is introduced into limiter circuit 2 through resistor 21 and is placed in parallel upon a plate and a cathode of separate sections of double diode limiter tube 22. On the remaining plate and cathode of the opposite sections of diode 22 are placed bias voltages from bias batteries 23 and 24. Each half of the diode 22 is non-conducting as long as the voltage on lead 25 has an absolute magnitude less than the voltage impressed on the tube by batteries 23 and 24. If the voltage on lead 25 becomes much larger, one-half of the diode or the other becomes conducting and prevents any further substantial increase of the voltage on lead 25, due to the low forward resistance of that half of the diode. The resultant output of tube 22 is then substantially a square wave, and if amplifier 1 has been correctly adjusted, the sides of this square wave are at approximately right angles to the time axis, as is illustrated in Fig. 6.

This output is then impressed on the control grid of tube 25' of amplifier 3. Amplifier 3 may be of the feedback type and may be exactly similar to amplifier 1 except that no input regulating potentiometer 12 need be supplied and that resistor 26 may be replaced by a condenser 27.

The output of amplifier 3 is then an amplified square wave which is fed into amplitude limiter 4, which may be exactly similar to limiter 2. Limiter 4 improves the squareness of the amplified square wave output of amplifier 3. The signal may then be passed through additional stages of amplification and limiting in circuits exactly similar to amplifier 3 and limiter 4, as desired, and is then fed into a final limiter stage 5 to be further corrected. Limiter 5 may be exactly similar to limiters 2 and 4.

In like manner, the alternating current signal whose phase is to be compared to the signal placed on leads 9, 9' is introduced via leads 11, 11' into amplifier 1', limited by limiter 2', amplified again by amplifier 3', and further limited and corrected in shape by limiters 4' and 5' to appear at the output of limiter 5' as a substantially perfect square wave with a minimum of phase distortion. Amplifier 1' may be exactly similar to amplifier 1, having a potentiometer similar to potentiometer 12 and controlled by knob 45. Limiter 2' is similar to limiter 2, amplifier 3' to amplifier 3, and limiters 4' and 5' to limiters 4 and 5. The square wave outputs of limiters 5 and 5' then bear an exactly fixed phase relation to the alternating current signals impressed on leads 9, 9', and 11, 11'; and, if limiters 4, 5 and 4', 5' are properly adjusted, are of substantially equal amplitude.

The square wave outputs of limiters 5, 5' are then introduced into sum tube circuits 6, 6' across potentiometers 28, 28'. By means of the taps on potentiometers 28, 28', exactly equal amplitude square wave signals may be placed on the control grids of feedback amplifier pentode tubes 29, 29'. The circuits associated with tubes 29, 29' may be exactly similar to those of amplifiers 3, 3'. The algebraic sum of the square wave voltages appearing at the plates of tubes 29, 29' then appears across load resistor 32, the plates of tubes 29, 29' being connected together by lead 30. Sum circuit amplifier tubes 29, 29' act to isolate one channel of the device from the other, so that the component output voltage appearing in resistor 32 due to one channel does not influence the action of the other channel. If the two component square wave voltages are in phase (the original alternating current voltages having been in phase), the voltage drop across resistor 32 will be of the character shown in Fig. 2. If the component square wave voltages are 90° out of phase, Fig. 3 represents the character of the voltage across resistor 32 as a function of time; and if the voltages are exactly 180° out of phase, there is seen, as is shown in Fig. 4, to be zero voltage across the resistor 32. Inspection of Figs. 2, 3, 4 indicates that the duration of current flow to ground in resistor 32 is proportional to the phase angle between the two component square wave voltages, and is thus also proportional to the phase angle between the two original input alternating current voltages impressed on amplifiers 1, 1'.

Vacuum tube voltmeter circuit 7 may be used to convert this square wave current to a direct current which is linear in phase difference between the two original alternating currents. The sum of the square wave voltages appearing across resistor 32 is placed through resistor 34 on the plate of diode 36 which is connected through resistor 35 to the grid of one side of twin triode 37, the grid of the other side of twin triode 37 being tied to the cathode of diode 36, to which the cathodes of tube 37 are also connected through resistor 41. The plates of twin triode 37 are placed across potentiometer 38, which is supplied with an adjustable tap 42 connecting to the positive side of battery 16, the direct current voltage appearing across potentiometer 38 then being applied to the terminals of meter 8, which may be a conventional milliammeter, by means of leads 43, 43'.

Diode 36 acts to rectify the square wave current flowing through resistor 34. The resultant square positive current pulses flowing through resistor 35 are averaged by resistor 35 in cooperation with condenser 44. The twin triode tube 37 acts as a push-pull direct current amplifier of the direct current voltages placed on its control grids, its cathode bias voltage being supplied by resistor 41. This construction eliminates a biased battery which would otherwise be necessary in series with meter 8 and which would require frequent adjustment.

The amplified direct current of this averaging type vacuum tube voltmeter 7 is then measured directly by meter 8. With the circuit constants of the amplifiers and limiters correctly designed, the indication of meter 8 may be conveniently made linear with phase angle, as shown by the graph of Fig. 5, over a frequency range of from 250 to 10,000 cycles per second, or over a greater range, as desired. The two input sine waves whose relative phase angles are to be determined do not need to be of the same amplitude. Potentiometer 12 in amplifier 1 and the corresponding potentiometer in amplifier 1' controlled by knob 45 may be adjusted so that these input voltages are of the same order of magnitude. The instrument may be conveniently designed to operate on input voltages varying from 0.5 to 5 R. M. S. volts without the use of adjusting potentiometers 12. The lower limit can be extended by the use of additional amplifying and limiting stages, as previously suggested, between limiters 4, 4' and limiters 5, 5'. In this manner, the device can be used to indicate phase angles not only between small or large input voltages, but also between voltages which are greatly different from one another.

Standard methods well known to the art may be used to obtain the calibration curve of meter 8. A convenient method of calibration is the following three point scheme. A voltage of any available frequency is applied to the input leads of amplifier 1, the input leads of amplifier 1' being short circuited. The volume control potentiometer 28 in sum circuit 6 is adjusted to produce a half scale deflection (90°) of meter 8. Then, similarly, the same voltage and frequency is introduced into amplifier 1', the input leads to amplifier 1 being short circuited, and the volume control potentiometer 28' in sum circuit 6' is adjusted to produce half scale deflection on meter 8. Then the same voltage is applied simultaneously to the inputs of both amplifiers 1, 1', producing full scale deflection of meter 8. Then the voltage on one of the amplifiers is reversed in phase, as by means of a transformer known to have zero phase shift, and the meter 8 has zero deflection, corresponding to the 180° point on the scale. As the calibration is linear, further points can be obtained in the well known manner.

It is seen that modifications of amplifiers 1, 1', 3, 3', limiters 2, 2', 4, 4', 5, 5', and vacuum tube voltmeter 7 may be made at will without departing from the scope of the present invention. Also, as many changes could be made in the above construction and as many apparently widely different embodiments of this invention could be made without departing from the scope thereof, it is intended that all matter contained in the above description or shown in the accompanying drawing should be interpreted as illustrative and not in the limiting sense.

What is claimed is:

1. A phase angle indicator comprising a plurality of independent channels, each channel being adapted to receive a respective one of the waves whose phase is to be compared, said channels comprising amplifier and limiting means for converting said waves into square form, each channel having a final amplifier means with an output impedance which is common to the other final amplifier means, the duration of current flow in such impedance means being substantially proportional to the phase angle between the respective waves, means connected for rectifying and filtering the current flowing through said impedance, and means connected to said rectifying and filtering means for measuring the resultant averaged current to thereby provide an indication of the phase angle between said waves.

2. A phase angle indicator as defined in claim 1 wherein said metering means comprises a push-pull amplifier supplied with said averaged current and a direct current meter connected across the output of said amplifier.

3. A method of measuring the phase angle between two sinusoidal waves comprising the steps of separately amplifying and limiting said respective waves to produce substantially square waves, adjusting said square waves to waves of equal amplitude, taking the algebraic sum of said waves, rectifying and filtering the resultant of said waves, and thereafter metering the average current so produced.

4. Apparatus for measuring the phase angle between two alternating waves comprising amplifiers for separately amplifying each of said waves, limiter means for limiting said amplified waves to produce substantially square waves, integrating circuits connected to said limiters for equalizing the amplitude of said substantially square waves and for producing the algebraic sum of said substantially square waves, and metering means fed by said algebraic sum and serving to indicate directly the phase angle between said alternating waves.

5. Apparatus for indicating the phase angle between two alternating waves comprising amplifier and limiter means providing separate input channels for changing said waves to substantially square shape, variable means for adjusting the output of at least one of said amplifier and limiter means for obtaining exactly equal amplitudes in said substantially square waves, means for superposing and combining said substantially square waves, and means for converting the algebraic sum of said substantially square waves into sensible indications of phase displacement between said waves.

6. In the apparatus defined in claim 5, said means for superposing and combining the waves comprising a load common to the output of both channels, and means for measuring the average current flow through said load.

7. Apparatus for measuring the phase angle between two alternating waves comprising amplifier and limiter means providing separate input channels for said waves and producing output waves of substantially square form, a common load directly coupled to the output waves of both channels, and means connected to said load for converting the algebraic sum of said waves into sensible indications of the phase displacement between said waves.

8. Apparatus for measuring the phase angle between two alternating waves comprising separate input channels for the respective waves embodying amplifying and limiting means for changing the waves into substantially square shape, a common load connected across the outputs of said channels, means for rectifying the current flow through said load, means for amplifying the direct current output of said rectifying means and a meter actuated by said amplified direct current.

9. Apparatus for measuring the phase angle between two alternating waves comprising separate input channels for the respective waves embodying amplifying and limiting means for changing the waves into substantially square form, at least one of said channels comprising means adjustable for equalizing the amplitude of said substantially square waves output by said channels, means connecting the outputs of said amplifying and limiting means to a common load, and means responsive to the resultant current flow through the load for sensibly indicating directly the phase angle between said waves.

EDWARD L. GINZTON.